(12) United States Patent
Golwalkar et al.

(10) Patent No.: US 9,614,828 B1
(45) Date of Patent: Apr. 4, 2017

(54) NATIVE AUTHENTICATION EXPERIENCE WITH FAILOVER

(71) Applicant: Amazon Technologies, Inc., Seattle, WA (US)

(72) Inventors: Yogesh Vilas Golwalkar, Pradesh (IN); Anuj Joshi, Seattle, WA (US); Bharath Kumar Bhimanaik, Bangalore (IN); Lorne Millwood, Seattle, WA (US); Carl Lucian Poston, IV, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 14/589,534

(22) Filed: Jan. 5, 2015

(51) Int. Cl.
*H04L 29/06* (2006.01)
*G06F 21/44* (2013.01)
*H04L 9/32* (2006.01)

(52) U.S. Cl.
CPC .............. *H04L 63/08* (2013.01); *G06F 21/44* (2013.01); *H04L 9/3234* (2013.01); *H04L 9/321* (2013.01)

(58) Field of Classification Search
CPC ................................ H04L 9/321; G06F 21/44
See application file for complete search history.

(56) References Cited

U.S. PATENT DOCUMENTS

| | | | | | |
|---|---|---|---|---|---|
| 8,234,715 | B2 * | 7/2012 | Zollinger | ......... | G11B 20/00086 380/44 |
| 9,077,693 | B2 * | 7/2015 | White | ................. | H04L 63/0428 |
| 2004/0224674 | A1 * | 11/2004 | O'Farrell | .......... | G06F 17/30575 455/418 |
| 2012/0251076 | A1 * | 10/2012 | Stewart | ................... | H04N 5/913 386/252 |
| 2013/0262626 | A1 * | 10/2013 | Bozek | ..................... | H04L 67/10 709/217 |
| 2013/0318154 | A1 * | 11/2013 | Jacobson | ................ | H04L 67/10 709/203 |
| 2013/0318569 | A1 * | 11/2013 | Canning | ............... | G06F 21/335 726/4 |
| 2013/0332838 | A1 * | 12/2013 | Naggar | .................. | G06Q 30/06 715/733 |
| 2014/0006474 | A1 * | 1/2014 | White | ................ | H04N 5/44543 709/201 |
| 2014/0082349 | A1 * | 3/2014 | Zarfoss, III | ............. | H04L 63/08 713/155 |
| 2014/0108614 | A1 * | 4/2014 | Gunderson | ...... | H04N 21/25816 709/219 |

(Continued)

OTHER PUBLICATIONS

Nintendo Tech Forums: Netflix activation code; http://techforums.nintendo.com/message/51971; Dec. 12, 2011.*

*Primary Examiner* — James Turchen
(74) *Attorney, Agent, or Firm* — Thomas | Horstemeyer, LLP (57) ABSTRACT

Disclosed are various embodiments for providing a native authentication experience with failover. If a particular authentication approach is supported by a network service, an application authenticates with the network service according to the authentication approach using an authentication factor received via a platform-specific interface. If the particular authentication approach is not supported, code-based linking may be employed to authenticate via another application that is authenticated with the network service.

20 Claims, 7 Drawing Sheets

(56) References Cited

U.S. PATENT DOCUMENTS

| | | | |
|---|---|---|---|
| 2014/0215556 A1* | 7/2014 | Shukla | H04L 9/3276 726/3 |
| 2015/0007262 A1* | 1/2015 | Aissi | G06F 21/60 726/2 |
| 2015/0128240 A1* | 5/2015 | Richards | H04L 63/0861 726/7 |

* cited by examiner

NATIVE AUTHENTICATION EXPERIENCE WITH FAILOVER

BACKGROUND

In order to gain access to secured online resources, a user may have to sign-in to an account. Typically, the user may have to provide a username and a password. In some cases, the user may have to answer one or more knowledge-based questions. Voice recognition, fingerprint recognition, face recognition, or other types of biometric identification may also be employed. Accounts may employ multi-factor authentication, relying on a combination of what the user knows, what the user has in his or her possession, who the user is from a biometric standpoint, where the user is, and so on, in order to improve security.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to providing failover for native authentication experiences. In the past, access to secured network resources often involved a browser-based experience. Hypertext markup language (HTML) defines several types of form input fields through which a user may provide information. Such form input fields may include text fields, checkboxes, radio button, text areas, and so on. These standard form types are largely platform agnostic, meaning that a sign-in page authored in HTML may be accessed via a variety of different computing systems.

Signing-in via a browser-based experience may have significant drawbacks as compared to platform-specific sign-in experiences. For example, many different authentication factors may not be directly supported by HTML. Any type of biometric identification may rely upon access to input devices beyond merely a touchscreen, keyboard, or mouse, such as a microphone or camera, and operating systems may limit access to such devices via a browser. Moreover, platforms may offer particular features that make it easier for users to provide authentication factors. Native applications may take advantage of such features to provide a superior authentication experience. Also, some devices may not be able to render a web view or browser, and downloading authentication pages may be time consuming on a slow network.

From time to time, a service provider may change how authentication to its accounts is performed. For example, different authentication factors may be required. Unfortunately, unlike network pages and browser-based applications, native applications may be difficult to update. Native applications may be deployed to embedded devices such as televisions, appliances, home automation systems, and so on, and application updating may be a cumbersome procedure. However, unless the native application is updated, authentication by way of the native application may fail.

Various embodiments of the present disclosure provide for failover for a native authentication experience through the use of code-based linking. In code-based linking, a code is first presented to the user via a first application or device. The user authenticates by a second application or device and then enters the code. When the code is provided via the second application or device, the service provider is able to authenticate the user at the first application or device, and both applications or devices become authenticated. Although code-based linking may be cumbersome as a primary authentication method, adding code-based linking as a failover for a native sign-in experience in an application ensures that the application will be usable in the future.

Figure 1A:
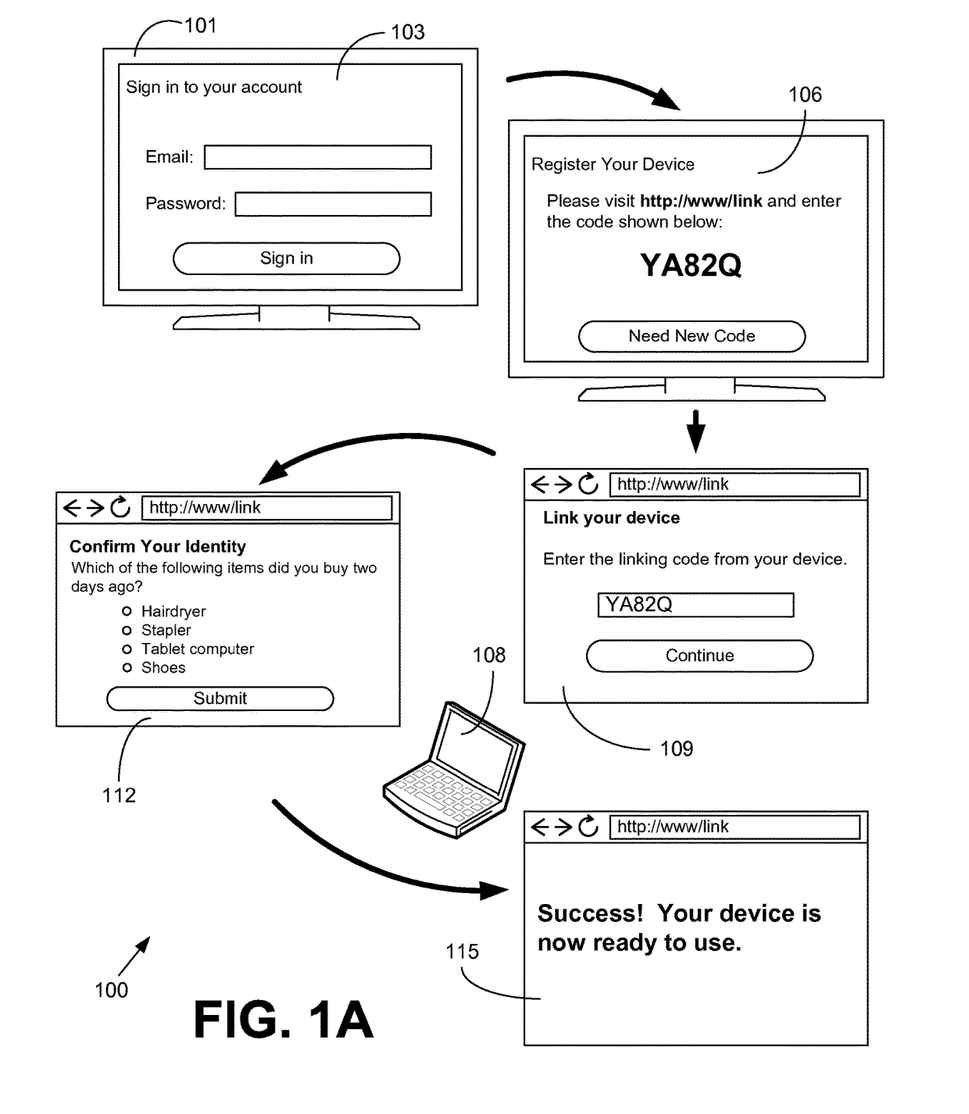
FIGS. 1A and 1B are diagrams depicting two example flows of user interfaces according to various embodiments of the present disclosure.

With reference to FIG. 1A, shown is a diagram illustrating an example flow of user interfaces 100 according to various embodiments. To begin, a user at a particular device (e.g., a television 101, which could be a smart television or may be coupled to an AMAZON FIRETV or other device) seeks to sign-in (or authenticate) to an account. The user interface 103 is rendered by a native application executed on the particular television 101 and elicits an email address and password for the account from the user. Suppose, however, that since the native application was released, the service provider has updated its authentication approach. For example, the updated authentication approach may also request an answer to a knowledge-based question, a biometric identification, a response to a Completely Automated Public Turing test to tell Computers and Humans Apart (CAPTCHA), or some other security measure. It may be that there is not a platform-specific application programming interface (API) on the television 101 to support the updated authentication approach.

Rather than denying access to the native application entirely, code-based linking is employed. Thus, the service provider sends a code to the native application, which is configured to present the code (i.e., "YA82Q") in user interface 106 via the television 101. Further, the user interface 106 also presents a uniform resource identifier (URI) such as a uniform resource locator (URL) (i.e., "http://www/link") at which the user may enter the code. The URI may be a URL if the access mechanism (e.g., "http," "ftp," etc.) is specified. The user interface 106 may also include a component for requesting a different code, should a different code be required due to expiration of the previous code, or for other reasons.

Next, on the same device or a different device (e.g., a laptop 108), the user may launch a browser or other browser-based application to access the URL. The user interface 109 elicits the code (i.e., "YA82Q") from the user. The browser may already be authenticated for the account, or in user interface 112, a network page may be rendered that elicits security credentials and/or other authentication factors from the user. In this example, the user interface 112 requests an answer to a knowledge-based question, "Which of the following items did you buy two days ago?" The requested credentials may be the same as or different from those in user interface 103. Upon providing the requested credentials, the browser may be authenticated to access the account, and consequently, the native application may also be authenticated to access the account. A user interface 115 may provide a confirmation that the native application has been authenticated (i.e., "Success! Your device is now ready to use").

Figure 1B:
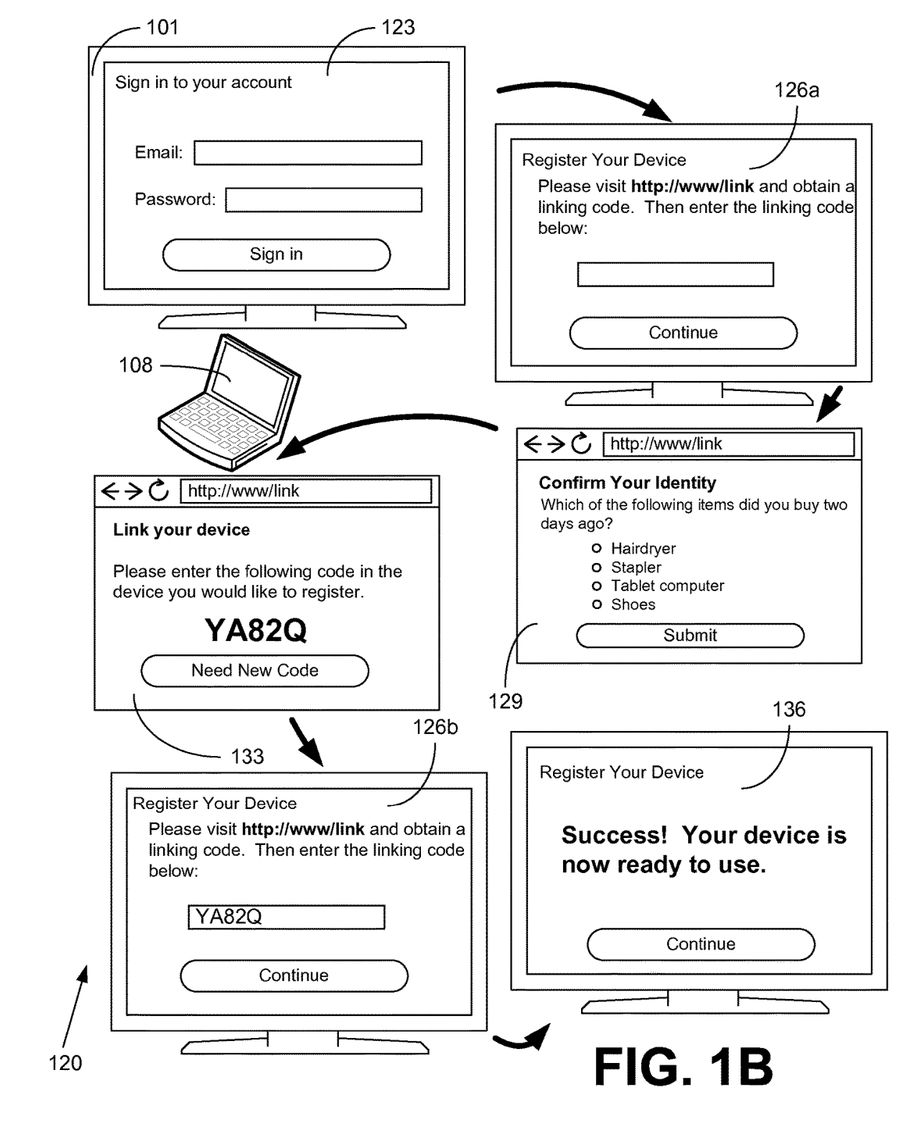

Turning now to FIG. 1B, shown is a diagram illustrating another example flow of user interfaces 120 according to various embodiments. The example flow in FIG. 1B works in the opposite direction of FIG. 1A. That is to say, a user obtains a code via a browser-based application and then provides the code to the native application to complete authentication.

To begin, a user at a particular device (e.g., a television 101, which could be a smart television or may be coupled to an AMAZON FIRETV or other device) seeks to sign-in (or authenticate) to an account. The user interface 123 is rendered by a native application executed on the television 101 and elicits an email address and password for the account from the user. Suppose, however, that since the native application was released, the service provider has updated its authentication approach to also request an answer to a knowledge-based question. Suppose that there is not a platform-specific application programming interface (API) on the particular device to request the answer to the knowledge-based question.

Rather than denying access to the native application entirely, code-based linking is employed. Here, user interface 126a presents a uniform resource locator (i.e., "http://www/link") at which the user may obtain a code. The user interface 126a also includes a form through which the user may enter the code once it is obtained.

Next, on the same device or a different device (e.g., laptop 108), the user may launch a browser or other browser-based application to access the URL. The browser may already be authenticated for the account, or in user interface 129, a network page may be rendered that elicits security credentials and/or other authentication factors from the user. In this example, the user interface 129 requests an answer to a knowledge-based question, "Which of the following items did you buy two days ago?" The requested credentials may be the same as or different from those in user interface 123. Upon providing the requested credentials, the browser may be authenticated to access the account.

The service provider then sends a code to the browser, which is configured to present the code (i.e., "YA82Q") in user interface 133. The user interface 133 may also include a component for requesting a different code, should a different code be required due to expiration of the previous code, or for other reasons.

Next, the user returns to the native application on the television 101, and the user interface 126b elicits the code (i.e., "YA82Q") from the user. Upon providing the code, the native application may be authenticated to access the account. A user interface 136 may provide a confirmation that the native application has been authenticated (i.e., "Success! Your device is now ready to use").

In some embodiments, it may be possible for the code to be copied from one device to another without relying on the user to manually enter the code. For example, the code may be transferred between devices via BLUETOOTH, WI-FI, near-field communication (NFC), and/or other networking technologies. To illustrate, in the example of FIG. 1A, in lieu of showing a code via the user interface 106, the television 101 may send broadcast or multicast messages containing the code via the local network. The laptop 108 would receive the broadcast or multicast messages via the local network. In some cases, a confirmation of the action may be requested of the user via the laptop 108. In other examples, the television 101 and laptop 108 could be paired to one another, and the code could be sent directly from the television 101 to the laptop 108 via a BLUETOOTH connection, an NFC connection, etc.

In another example, one device may show a quick-response (QR) code, a barcode, or other identifier corresponding to the code, which may then be scanned or captured by the other device, thereby effecting a transfer of the code. With respect to FIG. 1A, the user interface 106 may show a QR code instead of a text code, and the user interface 109 may launch a camera interface in order to capture the QR code via a camera.

In the following discussion, a general description of the system and its components is provided, followed by a discussion of the operation of the same.

Figure 2:
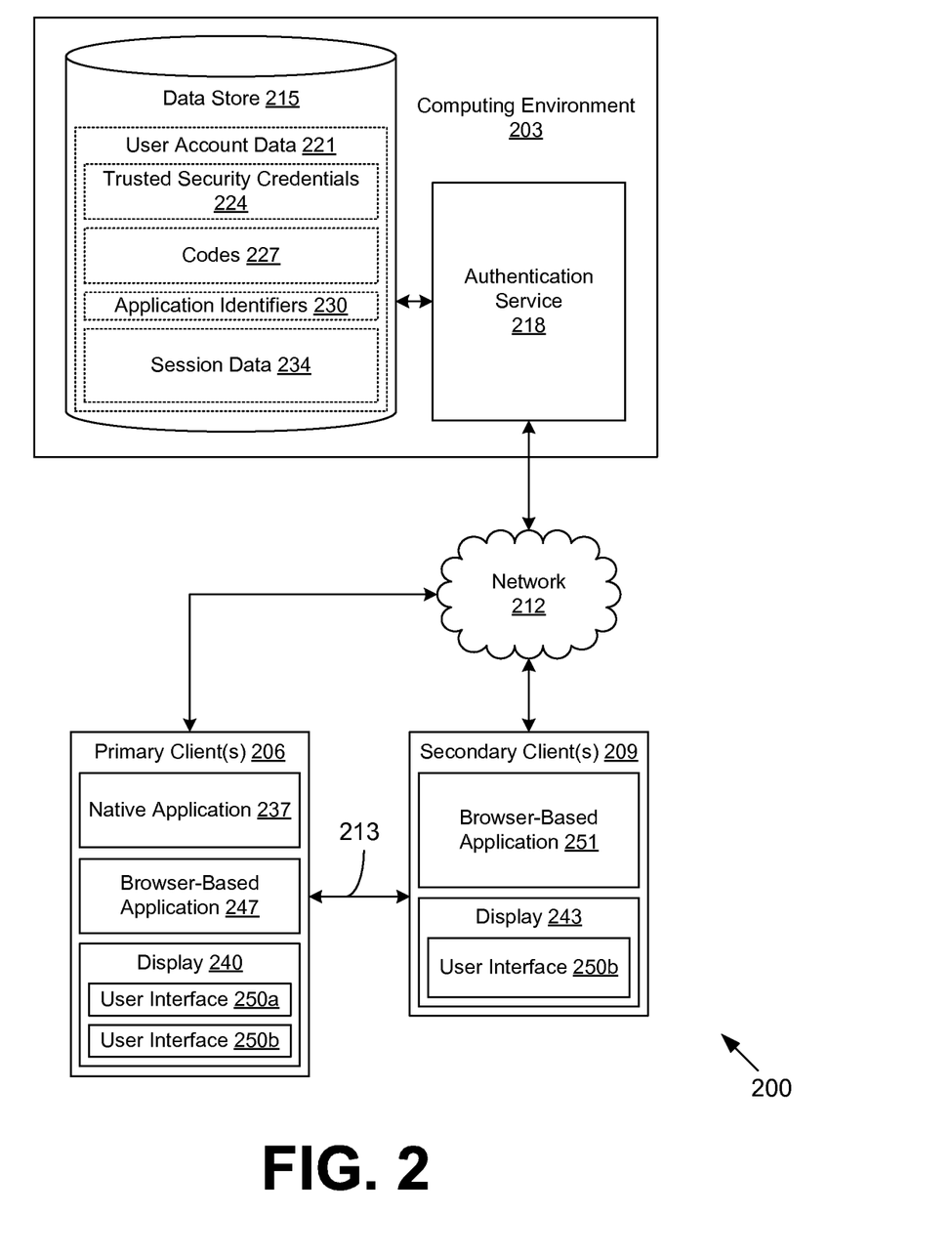
FIG. 2 is a schematic block diagram of a networked environment according to various embodiments of the present disclosure.

Referring next to FIG. 2, shown is a block diagram of a networked environment 200 according to various embodiments. The networked environment 200 includes a computing environment 203, one or more primary clients 206, and one or more secondary clients 209 in data communication via a network 212. The network 212 includes, for example, the Internet, intranets, extranets, wide area networks (WANs), local area networks (LANs), personal area networks (PANs), wired networks, wireless networks, other suitable networks, etc., or any combination of two or more such networks. Additionally, the secondary client 209 may be in data communication with the primary client 206 via a local communication channel 213, which may be the same as or separate from the network 212.

Other approaches for inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, one or more of the devices may be equipped with near field communication (NFC) transceivers that enabled the devices to directly exchange data. In still other embodiments, the devices may support acoustic-based data transfer. For example, one device may include software components and a speaker that enable the device to broadcast data to a second mobile device as sound waves, while the second mobile device may include software components and microphone that enable the second mobile device to receive the data embedded in the sound waves. Thus, one or more of radio signal-based data transfer (e.g., BLUETOOTH), light-based data transfer (e.g., infrared data transfer), or an acoustic-based data transfer (e.g., sound wave-embedded data) may be used for inter-device communication.

The computing environment 203 may comprise, for example, a server computer or any other system providing computing capability. Alternatively, the computing environment 203 may employ a plurality of computing devices that are arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include an authentication service 218 and other applications, services, processes, systems, engines, or functionality not discussed in detail herein. The authentication service 218 is executed to authenticate users at the primary clients 206 and secondary clients 209 for access to user accounts. In some embodiments, the authentication service 218 may serve up network pages that include user interfaces for logging onto user accounts and requesting ephemeral credentials. In other embodiments, the authentication service 218 may communicate with applications executed by the primary clients 206 and/or secondary clients 209 by way of an application programming interface (API). The authentication service 218 may correspond to an independent or federated identity provider and/or may facilitate a single sign-on experience for multiple different systems, services, etc., operated by one or more organizations.

The data stored in the data store 215 includes, for example, user account data 221 and potentially other data. The user account data 221 corresponds to data regarding user accounts for multiple users. The user account data 221 may include, for example, trusted security credentials 224, codes 227, application identifiers 230, session data 234, and/or other data. The trusted security credentials 224 may correspond to usernames, passwords, keys, answers to knowledge-based questions, social security numbers, biometric identification information, and/or other private information. In some cases, the trusted security credentials 224 may correspond to long-lived security credentials. Such credentials may be expected to persist for at least a predetermined length of time or indefinitely. For instance, the trusted security credentials 224 may be assumed to be valid until the user changes them. Alternatively, the trusted security credentials 224 may be valid for a month, six months, or another period of time according to a predefined security policy.

The codes 227 correspond to security credentials of an ephemeral nature that are used to authenticate primary clients 206 and/or native applications 237. For example, the codes 227 may include credentials such as a one-time password, a personal identification number, a token, or other types of credentials. The codes 227 may be relatively less trusted than the trusted security credentials 224. For example, the trusted security credentials 224 may be user-defined passwords that are intended to be long lived, while the codes 227 may be automatically generated numerical codes or dictionary words that are valid for a relatively shorter period of time. The codes 227 may be relatively less trusted because they may be selected for ease of memorization rather than credential strength. The codes 227 may be valid for a predetermined length of time (e.g., an hour, a day, etc.) and/or may expire in response to certain events. The codes 227 may be generated for specific primary clients 206 and/or instances of native applications 237 and may be invalid for use by other primary clients 206 and/or native applications 237.

The application identifiers 230 may include unique device identifiers, unique software identifiers, network addresses, media access control (MAC) addresses, serial numbers, and/or other types of identifiers for primary clients 206 and/or native applications 237. The application identifiers 230 may be employed in order to generate codes 227. A code 227 may be tied to a particular application identifier 230 so that it is valid only for a particular primary client 206 and/or instance of a native application 237.

The user account data 221 may include a list of trusted devices that a user may use in order to authenticate. The list may indicate authentication features supported, local communication channels 213 that are supported, etc., for the specific devices. For example, it may be determined that a user has a certain device that supports biometric authentication. The authentication service 218 may use this information in order to require users to use the certain device with the biometric authentication feature to complete authentication.

The session data 234 may include various state information relating to network data sessions between the primary client 206 and the computing environment 203 and/or between the secondary client 209 and the computing environment 203. The network data sessions may correspond to application sessions, TCP sessions, RTP sessions, and/or other sessions.

The primary client 206 and the secondary client 209 are examples of various client devices that may be coupled to the network 212. The primary clients 206 and the secondary clients 209 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, digital media players, microconsoles, home automation systems, or other devices. In one example, the primary client 206 may be a television device, and the secondary client 209 may be a mobile device. The primary client 206 may include a display 240, and the secondary client 209 may include a display 243. The displays 240, 243 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The primary client 206 may be configured to execute various applications such as a native application 237, a browser-based application 247, and/or other applications. The native application 237 may be executed in a primary client 206, for example, to access network content served up by the computing environment 203 and/or other servers, thereby rendering a user interface 250a on the display 240. The native application 237 is configured to use one or more platform-specific interfaces for authenticating with the authentication service 218, but with failover to code-based linking as will be described.

The browser-based application 247 may be executed in a primary client 206, for example, to access network content served up by the computing environment 203 and/or other servers, thereby rendering a user interface 250b on the display 240. The browser-based application 247 may, for example, correspond to a browser, a mobile application using web view, etc., and the user interface 250b may correspond to a network page, a mobile application screen, etc. The primary client 206 may be configured to execute applications beyond the native application 237 and the browser-based application 247 such as, for example, browsers, mobile applications, email applications, social networking applications, and/or other applications.

The secondary client 209 may be configured to execute various applications such as a browser-based application 251 and/or other applications. The browser-based application 251 may be executed in a secondary client 209, for example, to access network content served up by the computing environment 203 and/or other servers, thereby rendering a user interface 250b on the display 243. The browser-based application 251 may, for example, correspond to a browser, a mobile application using web view, etc., and the user interface 250b may correspond to a network page, a mobile application screen, etc. The secondary client 209 may be configured to execute applications beyond the browser-based application 251 such as, for example, browsers, mobile applications, email applications, social networking applications, and/or other applications. The browser-based application 251 may be the same as or different from the browser-based application 247.

Next, a general description of the operation of the various components of the networked environment 200 is provided. To begin, the native application 237 is installed upon the primary client 206. The native application 237 is configured to support certain predefined authentication approaches for authenticating with the authentication service 218. These authentication approaches may employ various platform-specific application programming interfaces (APIs) to obtain authentication factors from a user. Thus, the user is able to utilize a native sign-in experience that is likely to be smoother than a browser-based sign-in experience.

However, after the native application 237 is released, it may be necessary for the operators of the authentication service 218 to modify how authentication is performed. For example, security concerns may lead the operators to require answers to knowledge-based questions, fingerprint recognition, and/or other authentication factors. The installed versions of native application 237 and/or the platform-specific APIs may not support the modified authentication approach. Likewise, the authentication service 218 at some point may no longer support the authentication approaches supported by the native application 237.

Conversely, it may be that the authentication service 218 does not support an authentication approach required by a primary client 206. For example, a user may want to use multi-factor authentication with fingerprint recognition as an authentication factor. However, the authentication service 218 may not support fingerprint recognition. Alternatively, the user at the primary client 206 may wish to authenticate the authentication service 218 to ensure it is not a malicious party. In either scenario, the authentication service 218 may be configured with failover logic that leads to code-based linking being performed.

Several approaches may be used to determine that the native application 237 cannot authenticate. For example, an authentication version identifier supplied by the authentication service 118 to the native application 237 as part of a handshake may be newer than a latest supported authentication version of the native application 237. In another example, the authentication service 118 may simply request an authentication factor that is unknown or otherwise not supported by the native application 237. In this regard, the native application 237 may maintain a table of supported authentication factors and compare the requested factor to those listed in the table. The authentication service 118 may indicate in a handshake that it does not support a particular authentication factor that is required by the native application 237. Alternatively, the authentication service 118 may fail to indicate in a handshake that it does support a particular authentication factor that is required by the native application 237. In yet another example, the native application 237 may attempt authentication and may receive an error message from the authentication service 218 indicating authentication failure, but not due to incorrect credentials.

In some scenarios, the native application 237 and/or the primary client 206 generally may be unable to authenticate due to issues in establishing a secure connection between the primary client 206 and the computing environment 203. Suppose that the computing environment 203 requires a certain hardware or software configuration in order to establish a secure channel between the computing environment 203 and the primary client 206 (e.g., a cipher suite that the primary client 206 cannot support due to software or hardware configuration). The secure channel may be necessary before data can be transmitted over the communication channel (e.g., a key used for a digital rights management (DRM) protection scheme). Perhaps a vulnerability was discovered after the release of the primary client 206 and upgrading the primary client 206 is not possible.

It could be determined whether the user has another device (e.g., the secondary client 209) that supports the mechanism for establishing a cryptographically protected communications session. The user could be directed to go to the secondary client 209 and establish a secure channel with the computing environment 203. Data could then be transferred from the computing environment 203 to the secondary client 209 and then passed to the primary client 206 via the local communications channel 213. The data may be passed via the local communications channel 213 under the assumption that it may be more difficult for an external party to intercept due to a limited range.

If the native application 237 determines that it cannot authenticate due to unsupported authentication approaches, it is configured to fail over to a code-based linking approach. In the code-based linking approach, the native application 237 is configured to present a code, such as a code 227, to the user. The native application 237 may also present a uniform resource identifier (URI) such as a uniform resource locator (URL) for supplying the code 227. Subsequently, the browser-based application 247 or 251 is launched to access the URL, either on the primary client 206 or on the secondary client 209.

The browser-based application 247 or 251 may be authenticated with the authentication service 218 using browser-based authentication with trusted security credentials 224. The user may then supply the code 227, and the authentication service 218 may consequently authenticate the native application 237 through which the code 227 was presented. The authentication state of the browser-based application 247 or 251 may then be transferred to the native application 237. In some cases, the authentication state may be transferred from the authentication service 218 to the native application 237. Alternatively, the authentication state may be transferred from the browser-based application 247 or 251 to the native application 237.

Although many examples of the present disclosure refer to a browser-based application 247 or 251, it is understood that non-browser-based applications may be employed in some embodiments to facilitate code-based linking. For example, a different native application that supports the current authentication approach of the authentication service 218 may be used to facilitate code-based linking for the native application 237 that does not support the current authentication approach. Also, it is noted that the secondary client 209 may utilize device credentials (e.g., keys embedded in the secondary client 209) to authenticate to the computing environment 203 and/or cell towers or access points. This could be used at the computing environment 203 to select which device (of potentially multiple devices) that the user should use as the secondary client 209.

Figure 3:
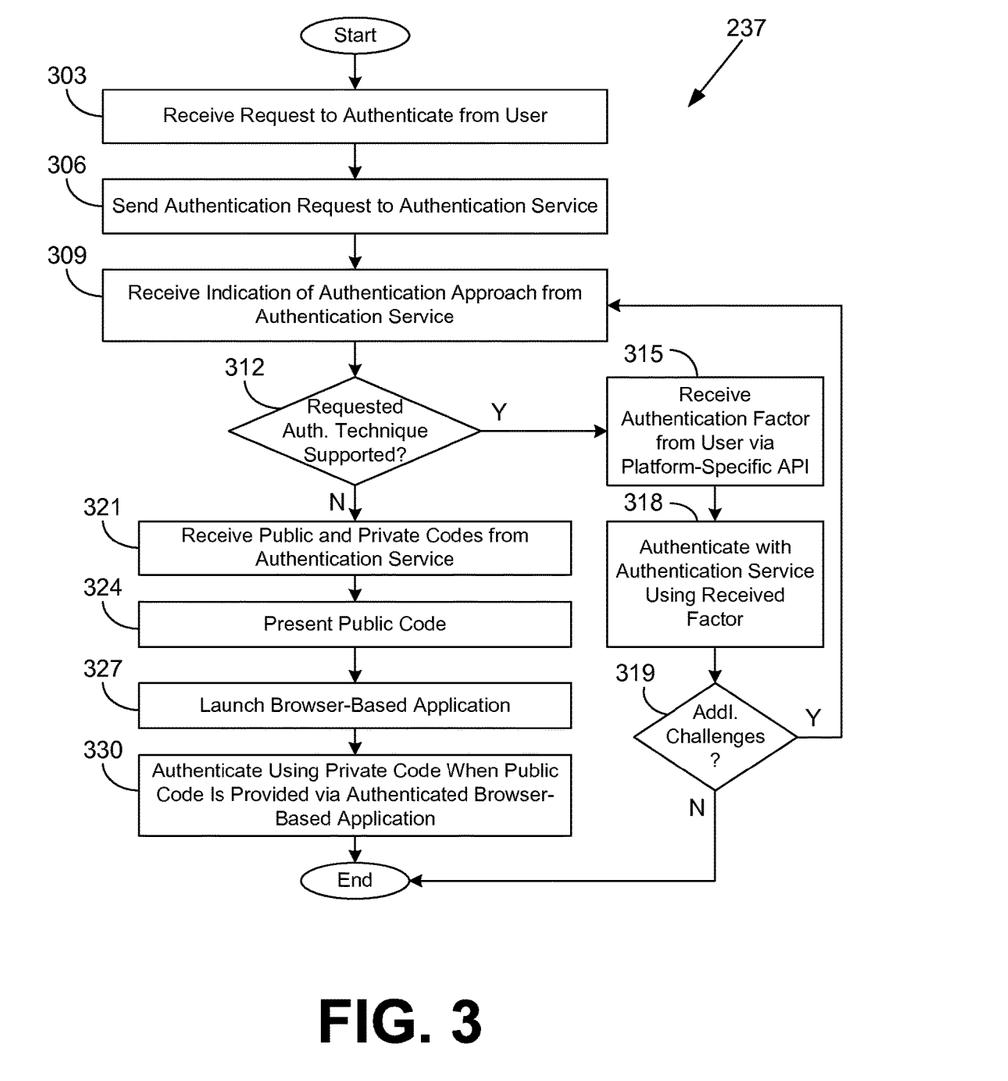
FIG. 3 is a flowchart illustrating one example of functionality implemented as portions of a native application executed in a primary client in the networked environment of FIG. 2 according to various embodiments of the present disclosure.

Moving now to FIG. 3, shown is a flowchart that provides one example of the operation of a portion of the native application 237 according to various embodiments. It is understood that the flowchart of FIG. 3 provides merely an example of the many different types of functional arrangements that may be employed to implement the operation of the portion of the native application 237 as described herein. As an alternative, the flowchart of FIG. 3 may be viewed as depicting an example of elements of a method implemented in the primary client 206 (FIG. 2) according to one or more embodiments.

Beginning with box 303, the native application 237 receives a request to authenticate with an authentication service 218 (FIG. 2) from a user. In some cases, the native application 237 may be configured to authenticate automatically, e.g., upon start up. The native application 237 may request one or more initial trusted security credentials 224 (FIG. 2) from the user, e.g., a username, a password, etc. In box 306, the native application 237 sends an authentication request to the authentication service 218 via the network 212 (FIG. 2).

In box 309, the native application 237 receives an indication of an authentication approach from the authentication service 218. For example, the indication may correspond to a version identifier, an identifier of one or more authentication factors that the authentication service 218 is requesting from the native application 237, and/or other approach indications. Based at least in part on this indication, the native application 237 determines in box 312 whether the native application 237 supports the authentication technique requested by the authentication service 218. Alternatively, the native application 237 may determine whether the authentication service 218 supports the authentication technique requested by the native application 237. In some cases, the authentication technique to be used may be negotiated between the native application 237 and the authentication service 218. For example, a particular authentication factor may be required at some interval, which could be randomly selected, based at least in part on an application or data that the native application 237 is attempting to access or an amount of time that has passed since a previous code-based linking.

If the requested authentication technique is supported, the native application 237 continues to box 315 and receives one or more authentication factors from the user via a platform-specific (i.e., native) API. In box 318, the native application 237 authenticates with the authentication service 218 using the received authentication factors. In box 319, the native application 237 determines whether additional authentication challenges are necessary. For example, after the user successfully signs in with his or her username and password, the user may have to answer a knowledge-based question. In some cases, this may be necessary in order to access a resource having a higher level of security. If additional challenges are necessary, the native application 237 returns to box 309 and receives an indication of the authentication approach associated with the additional challenge(s). An additional check may be performed to determine whether that authentication approach is supported. Otherwise, the portion of the native application 237 ends.

If the native approach is not supported, the native application 237 moves from box 312 to box 321 and receives a public code 227 (FIG. 2) and private code 227 from the authentication service 218. The public code 227 and the private code 227 may be of the same length or different length. In some cases, the public code 227 may be shorter than the private code 227 or encoded in a way that a user may easily remember or otherwise enter the public code 227 in a user interface form field. For example, the public code 227 may be a five-character alphanumeric string, while the private code 227 may comprise binary data of 1024 bits. Although both the public and private codes 227 may be sent over the network 212, the private code 227 may be considered as "private" because it is not displayed to the user, provided to the secondary client 209 (FIG. 2), or provided to a browser-based application 247 (FIG. 2) or 251 (FIG. 2).

In box 324, the native application 237 presents the public code 227 to the user. For example, the native application 237 may render this public code 227 upon a display 240 (FIG. 2) as text or as a machine-readable identifier (e.g., a QR code). Alternatively, the native application 237 may read out this public code 227 via a text-to-speech interface or convey the public code 227 to the user via another approach. The native application 237 may also present a URI or URL to the user that corresponds to a network page in which the user may supply the public code 227 to the authentication service 218. In one example, the public code 227 may be included in the URL. In one embodiment, the public code 227 may be transferred to another application such as a browser-based application 247 or 251 using a multicast network protocol, WI-FI, BLUETOOTH, NFC, etc.

In box 327, the native application 237 may launch a browser-based application 247. The native application 237 may supply the URL to the browser-based application 247 so that the browser-based application 247 will launch into the network page at the URL. Alternatively, the user may launch the browser-based application 247 or 251, either on the primary client 206 or on the secondary client 209. If the user manually launches the browser-based application 247, the user may also manually enter the URL and/or the public code 227.

In box 330, the native application 237 authenticates with the authentication service 218 when the public code 227 is provided via the browser-based application 247 or 251, assuming that the browser-based application 247 or 251 is successfully authenticated with the authentication service 218 using the trusted security credentials 224. In one embodiment, the native application 237 may use a private code 227 obtained as a pair to the public code 227 in order to authenticate with the authentication service 218. The native application 237 may exchange this private code 227 for another session identifier in some embodiments. Thereafter, the portion of the native application 237 ends. As an alternative to FIG. 3, it is noted that in some embodiments, the public code 227 may be presented via the browser-based application 247 or 251 and received by the native application 237.

Figure 4:
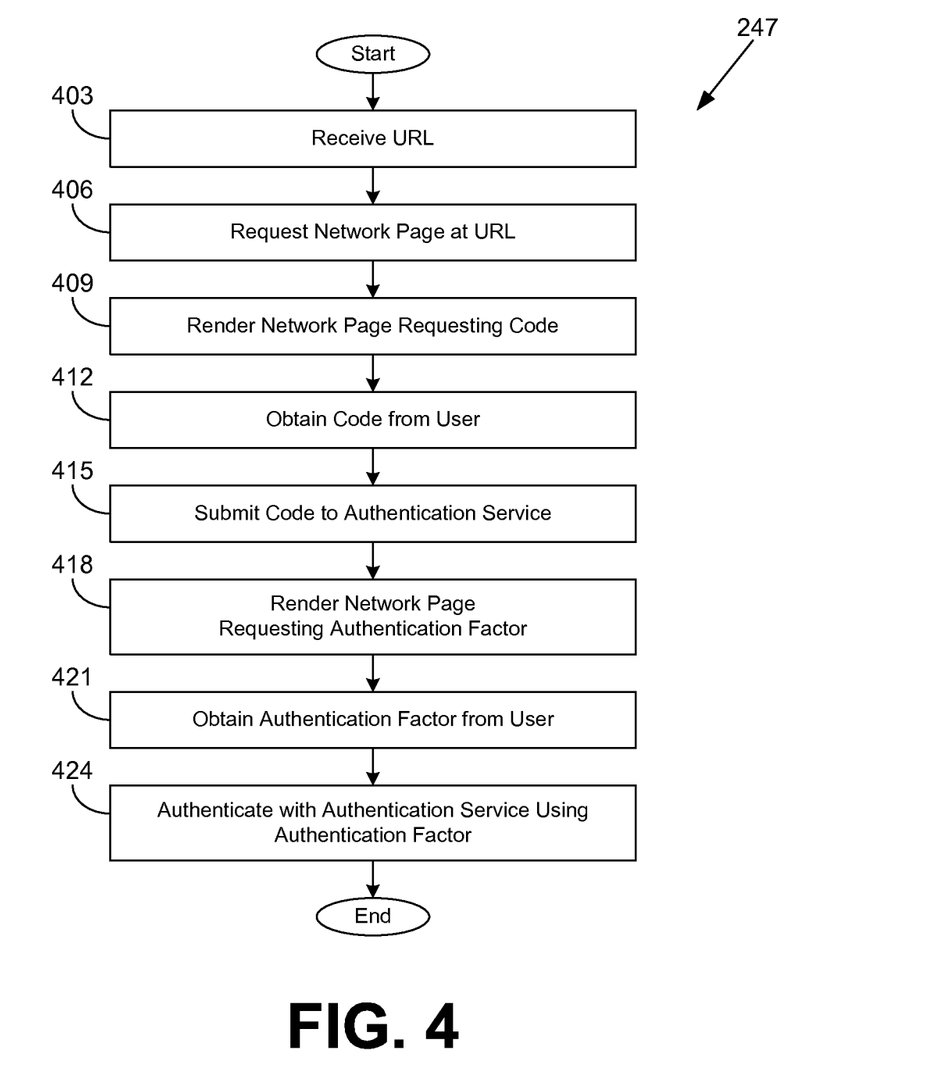
FIG. 4 is a flowchart illustrating one example of functionality implemented as portions of a browser-based application executed in a primary client or secondary client in the networked environment of FIG. 2 according to various embodiments of the present disclosure.

Referring next to FIG. 4, shown is a flowchart that provides one example of the operation of a portion of the browser-based application 247 (or 251 (FIG. 2)) according to various embodiments. It is understood that the flowchart of FIG. 4 provides merely an example of the many different types of functional arrangements that may be employed to implement the operation of the portion of the browser-based application 247 as described herein. As an alternative, the flowchart of FIG. 4 may be viewed as depicting an example of elements of a method implemented in the primary client 206 (FIG. 2) or the secondary client 209 (FIG. 2) according to one or more embodiments. Although the discussion of FIG. 4 uses the example of a browser-based application 247, it is understood that a native application capable of authentication may be used instead to perform the code-based linking on behalf of another native application 237 (FIG. 2) that is not capable of authentication.

Beginning with box 403, the browser-based application 247 receives a URI or URL. The URL may be provided manually by the user, or automatically if the browser-based application 247 is launched by the native application 237. In box 406, the browser-based application 247 requests the network page at the URL from the authentication service 218 (FIG. 2) via the network 212 (FIG. 2).

In box 409, the browser-based application 247 renders the network page, which includes one or more user interface elements that elicit a code 227 (FIG. 2) from the user. In box 412, the browser-based application 247 obtains the code 227 from the user via the network page. In box 415, the browser-based application 247 submits the code 227 to the authentication service 218. As an alternative to boxes 409-415, the code 227 may be included within the URL received in box 403 and submitted in box 406 in some embodiments.

In another embodiment, the browser-based application 247 may receive the code 227 from the native application 237 via the local communication channel 213 (FIG. 2) or inter-process communication. The browser-based application 247 may discover the native application 237, or vice versa, using discovery and launch (DIAL) or another approach. The browser-based application 247 may then render the received code 227 via a user interface 250b (FIG. 2), while the native application 237 also renders the received code 227 via a user interface 250a (FIG. 2). The user may then confirm that the two codes 227 match via the browser-based application 247, and this confirmation may be reported back to the authentication service 218 to facilitate authentication of the native application 237.

In box 418, the browser-based application 247 renders a network page requesting one or more authentication factors. For example, the browser-based application 247 may request trusted security credentials 224 such as a username, a password, a one-time password, biometric identifiers, and so on. The browser-based application 247 obtains the authentication factors from the user in box 421. In box 424, the browser-based application 247 authenticates with the authentication service 218 using the authentication factors. It is noted that the browser-based application 247 may be authenticated prior to submitting the code 227 in box 415 in some examples. Thereafter, the portion of the browser-based application 247 ends.

Figure 5:
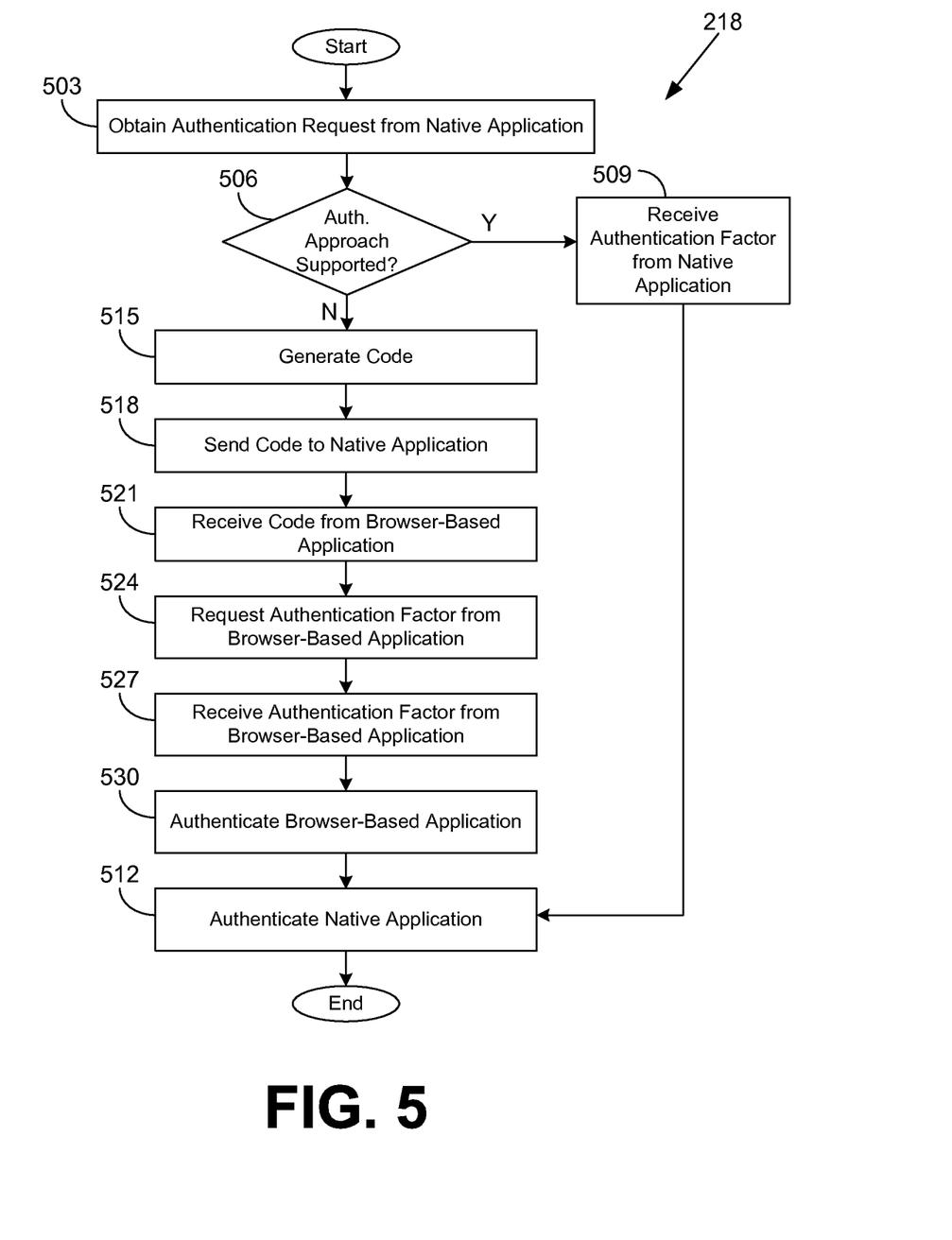
FIG. 5 is a flowchart illustrating one example of functionality implemented as portions of an authentication service executed in a computing environment in the networked environment of FIG. 2 according to various embodiments of the present disclosure.

Continuing now to FIG. 5, shown is a flowchart that provides one example of the operation of a portion of the authentication service 218 according to various embodiments. It is understood that the flowchart of FIG. 5 provides merely an example of the many different types of functional arrangements that may be employed to implement the operation of the portion of the authentication service 218 as described herein. As an alternative, the flowchart of FIG. 5 may be viewed as depicting an example of elements of a method implemented in the computing environment 203 (FIG. 2) according to one or more embodiments.

Beginning with box 503, the authentication service 218 obtains an authentication request from a native application 237 (FIG. 2). In box 506, the authentication service 218 determines whether the native authentication approach is supported. Alternatively, this determination may be made by the native application 237 based at least in part on what is requested by the authentication service 218. The authentication service 218 may respond with a version identifier that corresponds to an identification of a supported authentication approach.

If the native authentication approach is supported, the authentication service 218 moves to box 509 and receives an authentication factor from the native application 237. The authentication service 218 then authenticates the native application 237 in box 512 by comparing the received authentication factor with the stored trusted security credentials 224 (FIG. 2) in the data store 215 (FIG. 2). Thereafter, the portion of the authentication service 218 ends.

If the native authentication approach is not supported, the authentication service 218 falls back to code-based linking. Thus, the authentication service 218 moves from box 506 to box 515 and generates a code 227 (FIG. 2). The authentication service 218 sends the code 227 to the native application 237 in box 518. In some cases, the authentication service 218 may send a pair of a public code 227 and a private code 227 to the native application 237 via a secured channel.

In box 521, the authentication service 218 receives the public code 227 from a browser-based application 247 (FIG. 2) as a confirmation. The authentication service 218 may compare the received code 227 with a stored code 227 in the data store 215. Alternatively, the authentication service 218 may simply receive a confirmation from the browser-based application 247 without the code 227. For example, the browser-based application 247 may receive the code 227 from the native application 237 via the local communication channel 213 (FIG. 2) or inter-process communication. The browser-based application 247 may then render the received code 227 via a user interface 250b (FIG. 2), while the native application 237 also renders the received code 227 via a user interface 250a (FIG. 2). The user may then confirm that the two codes 227 match via the browser-based application 247.

In box 524, where the browser-based application 247 is not already authenticated, the authentication service 218 may request one or more authentication factors from the user via the browser-based application 247. In box 527, the authentication service 218 receives the requested authentication factors from the browser-based application 247.

In box 530, the authentication service 218 authenticates the browser-based application 247 upon evaluation of the received authentication factors in comparison with the stored trusted security credentials 224. In box 512, the authentication service 218 authenticates the native application 237, possibly in response to the native application 237 supplying the private code 227 that matches the public code 227. Thereafter, the portion of the authentication service 218 ends.

Figure 6:
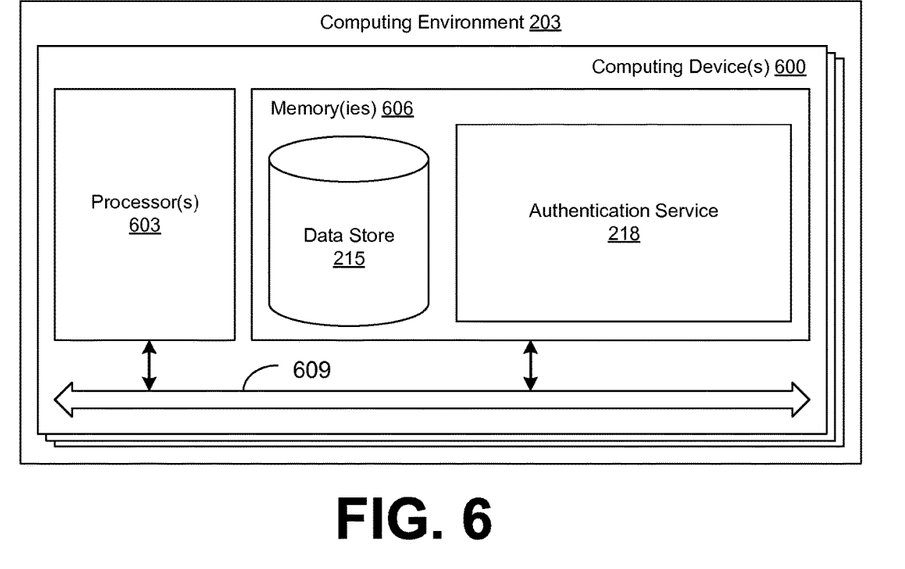
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606, 706 and executable by the processor 603 are the authentication service 218 and potentially other applications. Also stored in the memory 606 may be a data store 215 and other data. In addition, an operating system may be stored in the memory 606 and executable by the processor 603.

Figure 7:
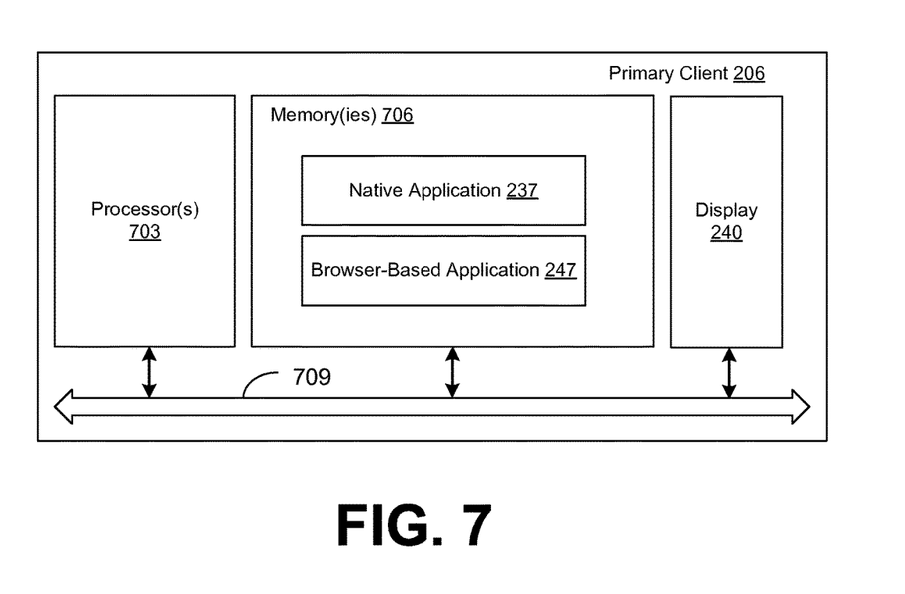
FIG. 7 is a schematic block diagram that provides one example illustration of a primary client employed in the networked environment of FIG. 2 according to various embodiments of the present disclosure.

With reference to FIG. 7, shown is a schematic block diagram of the primary client 206 according to an embodiment of the present disclosure. The primary client 206 includes at least one processor circuit, for example, having a processor 703 and a memory 706, both of which are coupled to a local interface 709. To this end, the primary client 206 may comprise, for example, at least one client computer or like device. The local interface 709 may comprise, for example, a data bus with an accompanying address/control bus or other bus structure as can be appreciated. A display 240 may be coupled to the local interface 709.

Stored in the memory 706 are both data and several components that are executable by the processor 703. In particular, stored in the memory 606, 706 and executable by the processor 703 are the native application 237, the browser-based application 247, and potentially other applications. In addition, an operating system may be stored in the memory 706 and executable by the processor 703.

Referring now to both FIGS. 6 and 7, it is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors 603, 703 and/or multiple processor cores and the memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the authentication service 218, the native application 237, the browser-based application 247, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the authentication service 218, the native application 237, and the browser-based application 247. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 218, the native application 237, and the browser-based application 247, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 218, the native application 237, and the browser-based application 247, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a native application executable in at least one computing device, wherein when executed the native application causes the at least one computing device to at least:
   request to access an account with a network service;
   in response to receiving a request for an authentication factor from the network service, determine whether the authentication factor is supported by the native application;
   in response to determining that the authentication factor is supported by the native application, authenticate with the network service to access the account using the authentication factor received via a platform-specific application programming interface that is native to the at least one computing device;
   in response to determining that the authentication factor is not supported by the native application due to a change in how authentication is performed by the network service, render a uniform resource identifier (URI) upon a display, the URI including a public code received from the network service; and
   after the URI is accessed by a browser-based application that is or becomes authenticated with the network service to access the account, authenticate with the network service to access the account using a private code received from the network service, the private code being paired with the public code.

2. The non-transitory computer-readable medium of claim 1, wherein the URI is a uniform resource locator (URL) specifying an access mechanism.

3. The non-transitory computer-readable medium of claim 1, wherein the browser-based application is authenticated with the network service to access the account prior to accessing the URI.

4. The non-transitory computer-readable medium of claim 1, wherein the browser-based application is authenticated with the network service to access the account after accessing the URI.

5. A system, comprising:
   a computing device comprising a processor and a memory; and
   a first application, stored in the memory, executable in the computing device, wherein when executed the first application causes the computing device to at least:

determine whether an authentication approach is supported by a network service;

in response to determining that the authentication approach is supported by the network service, authenticate with the network service according to the authentication approach using at least one authentication factor received via a platform-specific application programming interface that is native to the computing device; and in response to determining that the authentication approach is not supported by the network service due to a change in how authentication is performed by the network service, facilitate code-based linking via a second application that is authenticated with the network service.

6. The system of claim 5, wherein the code-based linking comprises presenting, by the first application, a code received from the network service, wherein the network service is configured to authenticate the first application in response to receiving the code via the second application.

7. The system of claim 5, wherein the code-based linking comprises presenting, by the second application, a code received from the network service, wherein the network service is configured to authenticate the first application in response to receiving the code via the first application.

8. The system of claim 5, wherein the first application is a native application, and the second application is a browser-based application.

9. The system of claim 5, wherein when executed the first application further causes the computing device to at least launch the second application in response to determining that the authentication approach is not supported by the network service.

10. The system of claim 9, wherein the second application is configured to load a network page that elicits a code from a user.

11. The system of claim 5, wherein determining whether the authentication approach is supported is based at least in part on a particular authentication factor requested by the network service.

12. The system of claim 5, wherein determining whether the authentication approach is supported is based at least in part on a version identifier received from the network service.

13. The system of claim 5, wherein the first application is executed by a first computing device, and the second application is executed by a second computing device.

14. A method, comprising:

receiving, via at least one of one or more computing devices, an authentication request from a first application;

identifying, via at least one of the one or more computing devices, an authentication factor provided via a platform-specific application programming interface native to a computing device upon which the first application is executed;

determining, via at least one of the one or more computing devices, that the authentication factor is not supported due to a change in how authentication is performed by the one or more computing devices;

providing, via at least one of the one or more computing devices, a code to the first application in response to determining that the authentication factor is not supported; and authenticating, via at least one of the one or more computing devices, the first application in response to receiving the code from a second application that is authenticated.

15. The method of claim 14, wherein determining, via at least one of the one or more computing devices, that the authentication factor is not supported further comprises determining that the authentication factor is required by the first application but is not supported by the one or more computing devices.

16. The method of claim 14, wherein determining, via at least one of the one or more computing devices, that the authentication factor is not supported further comprises the authentication factor is required by the one or more computing devices but is not supported by the first application.

17. The method of claim 14, further comprising, before determining that the authentication factor is unsupported, receiving another authentication factor supplied via the platform-specific application programming interface from the first application.

18. The method of claim 14, wherein the code corresponds to a public code, and the method further comprises:

providing, via at least one of the one or more computing device, a private code along with the public code to the first application; and authenticating, via at least one of the one or more computing devices, the first application in response to receiving the private code from the first application in addition to receiving the public code from the second application.

19. The method of claim 14, wherein the second application is authenticated via a browser-based authentication before the code is received from the second application.

20. The method of claim 14, wherein the second application is authenticated via a browser-based authentication after the code received from the second application.

* * * * *